ized Jan. 2, 1973

3,708,316
GLASS
Gleb Alexandrovich Stepanov, ulitsa 1 Mashinostroeniya 2/7, korpus 1, kv. 158; Semen Semenovich Chernyakov, Valovaya ulitsa 8/18, kv. 146; and Tsetsiliya Aronovna Karchmar, 1 Kirpichny pereulok 14, kv. 62, all of Moscow, U.S.S.R.
Filed Jan. 13, 1970, Ser. No. 2,666
Int. Cl. C03c *3/10, 3/04, 3/30*
U.S. Cl. 106—53                      1 Claim

ABSTRACT OF THE DISCLOSURE

A glass for conical portions of kinescope bulbs containing (percent by weight):

| | |
|---|---|
| $SiO_2$ | 58.8–60.8 |
| $Al_2O_3$ | 3.0–4.0 |
| MgO | 2.0–3.0 |
| CaO | 4.9–6.1 |
| BaO | 2.0–2.6 |
| $Na_2O$ | 5.3–6.5 |
| $K_2O$ | 7.6–9.6 |
| $F_2$ | 0.5–1.1 |
| $Sb_2O_3$ | 0.15–0.35 |
| PbO | 10.0–11.0 | into the composition of which there is added $Li_2O$ in the amount of 0.3 to 0.7 percent by weight.

---

The present invention relates to glass compositions used essentially for making conical portions of kinescope bulbs with a screen of more than 50 cm. in diagonal employed both in black-and-white and color television sets.

To provide for the X-ray protection properties, the composition of such a glass usually includes oxides having of a high molecular weight cation such as BaO and PbO, preferably the latter, as the effective area of the section of lead ions is considerably large than that of the barium ions.

To provide reliable absorption of the scattered X-ray radiation developed due to the bombardment of the conical portion of a kinescope by a flow of secondary and reflected electrons, it is sufficient to have the content of lead in the glass composition not exceeding 10.0 to 11.0 percent by weight.

On the other side, in order that the glass of the conical portion will have the required electrical insulation properties, the content of alkaline oxides therein must not exceed 13.0 to 16.0 percent by weight.

In order to eliminate the spontaneous crystallization of such a glass the manufacturer includes in its composition up to 5% $Al_2O_3$ in addition to alkaline earth oxides.

The following glass compositions may be taken as an example (percent by weight):

| | $SiO_2$ | $Al_2O_3$ | MgO | CaO | BaO | PbO | $Na_2O$ | $K_2O$ | $Sb_2O_3$ |
|---|---|---|---|---|---|---|---|---|---|
| Composition I | 60.1 | 3.4 | 2.5 | 5.2 | 1.2 | 10.6 | 8.6 | 8.2 | 0.1 |
| Composition II | 57.4 | 1.3 | | | | 26.7 | 8.5 | 8.6 | 0.38 |

The above-mentioned glass compositions have a relatively high softening point and this considerably complicates the making of reliable and gas-tight joints of the conical portion with the body-tube made of low melting high-lead glass and through a thin layer of glass cement with the kinescope screen made of glass containing $Li_2O$ and BaO.

Attempts to use the glass of the following composition (percent by weight):

| | |
|---|---|
| $SiO_2$ | 58.0 |
| $Al_2O_3$ | 4.8 |
| MgO | 3.0 |
| CaO | 5.4 |
| BaO | 1.4 |
| PbO | 10.0 |
| $Na_2O$ | 8.7 |
| $K_2O$ | 8.0 |
| $F_2$ | 0.7 | for making the cones of kinescopes have not given positive results due to development of considerable stresses within the zone of the welded joint with the high-lead glass of the body-tube of the kinescope bulb having the following composition (percent by weight):

| | |
|---|---|
| $SiO_2$ | 55.0 |
| $Al_2O_3$ | 2.0 |
| PbO | 30.0 |
| $Na_2O$ | 3.8 |
| $K_2O$ | 9.2 |

An object of the present invention is to provide such a glass for making a conical portion of a kinescope bulb which would have properties (thermal expansion factor, softening point, heat resistance) which would provide for forming a vacuum-tight junction of the conical portion with the high-lead body-tube glass and through a glass cement layer with the screen made of glass containing $Li_2O$ and BaO.

Another object of the invention is to provide a glass for making a conical portion of a kinescope featuring a comparatively high rate of absorption of X-ray radiation.

These and other objects are attained according to the invention by a glass which contains the following components (percent by weight): $SiO_2$ 58.8 to 60.8; $Na_2O$ 5.3 to 6.5; $Al_2O_3$ 3.0 to 4.0; $K_2O$ 7.6 to 9.6; MgO 2.0 to 3.0; $F_2$ 0.5 to 1.1; CaO 4.9 to 6.1; $Sb_2O_3$ 0.15 to 0.35; BaO 2.0 to 2.6; PbO 10.0 to 11.0 and $Li_2O$ 0.3 to 0.7.

Lithium oxide, as is known, considerably increases the ion component of the chemical bonds formed thereby with the surrounding structural groups of the glass and this increases their mobility, reduces the glass viscosity and helps to decrease the rate of "mixing" of the welded glasses in the joint.

The addition of lithium oxide into the composition of lead-containing glass gives the glass the necessary X-ray protection properties and provides for a reliable junction of the glass of the conical portion of the kinescope bulb with the glass of the body-tube and screen.

The glass according to the invention can be made of a charge usually employed in glass making: glass sand, soda ash, potash, calcium carbonate, minimum and lithium hydroxide. The charge materials are carefully mixed and transferred to a glass-making furnace. In the case of mass production of the cones, the glass is melted in gas-fired continuous regeneration bath furnaces with an oxidizing flame.

The glass-making temperature is 1450° C., the working temperature using the centrifugal method of forming is 1200° C. The conical portion of a kinescope bulb is baked in continuous baking furnaces; the upper limit of the baking temperature is about 520° C., the lower limit is about 400° C.

Given below are the compositions of the glass in accordance with the invention and which are selected depending on the composition of the glasses used for making TV body-tubes and screens.

| Glass components | Content, percent by weight | | | | |
|---|---|---|---|---|---|
| | I | II | III | IV | V |
| $SiO_2$ | 60.3 | 60.8 | 59.0 | 59.0 | 58.8 |
| $Al_2O_3$ | 3.0 | 3.2 | 3.6 | 4.0 | 3.2 |
| MgO | 2.0 | 2.1 | 2.5 | 3.0 | 2.4 |
| CaO | 6.1 | 4.9 | 5.5 | 5.7 | 6.1 |
| BaO | 2.0 | 2.0 | 2.3 | 2.2 | 2.6 |
| PbO | 11.0 | 10.0 | 10.0 | 11.0 | 10.3 |
| $Li_2O$ | 0.5 | 0.7 | 0.5 | 0.3 | 0.7 |
| $K_2O$ | 7.6 | 8.95 | 8.6 | 8.0 | 9.6 |
| $F_2$ | 0.65 | 1.1 | 0.8 | 0.5 | 0.7 |
| $Sb_2O_3$ | 0.35 | 0.15 | 0.3 | 0.2 | 0.3 |

$Na_2O$ constitutes the balance of the above compositions.

The above glass compositions have the following physical and chemical properties:

| | |
|---|---|
| Linear thermal expansion factor, $°C.^{-1}$ | $93–96 \times 10^{-7}$ |
| Softening point, °C. | $535 \pm 10$ |
| Temperature at which the specific volume electric resistance is equal to 100 meg·cm·degree C., °C. | $\cong 280$ |
| Tangent of dielectric loss angle at a frequency of $10^{-6}$ c./s. and a temperature of 20° C. | $\leq 16 \times 10^{-4}$ |
| Dielectric constant | $\leq 7.5$ |
| Stresses in baked joints with screen glass containing BaO and $Li_2O$ and with high-lead glass of body-tube | $\leq 50$ nm./cm. |
| Thermal resistance in kinescope envelopes with a diagonal of 59 cm., °C. | $\geq 80$ |
| Relative X-ray penetration | $<0.7$ |

What is claimed is:
1. A glass consisting essentially of (percent by weight):

| | |
|---|---|
| $SiO_2$ | 58.8–60.8 |
| $Al_2O_3$ | 3.0–4.0 |
| MgO | 2.0–3.0 |
| CaO | 4.9–6.1 |
| BaO | 2.0–2.6 |
| $Na_2O$ | 5.3–6.5 |
| $K_2O$ | 7.6–9.6 |
| $F_2$ | 0.5–1.1 |
| $Sb_2O_3$ | 0.15–0.35 |
| PbO | 10.0–11.0 |
| $Li_2O$ | 0.3–0.7 | having a linear thermal expansion factor of $93–96 \times 10^{-7}$ °C.$^{-1}$, a softening point of $535 \pm 10°$ C., and a relative X-ray penetration of $<0.7$.

References Cited

UNITED STATES PATENTS

| | | | |
|---|---|---|---|
| 3,258,352 | 6/1966 | Paymal | 106—53 X |
| 3,422,298 | 1/1969 | Debeir | 106—53 X |

FOREIGN PATENTS

| | | | |
|---|---|---|---|
| 55914 | 3/1944 | Netherlands | 106—53 |

JAMES E. POER, Primary Examiner

M. L. BELL, Assistant Examiner